United States Patent
Schwarte et al.

(10) Patent No.: US 6,750,286 B1
(45) Date of Patent: Jun. 15, 2004

(54) POLYURETHANE AND ITS USE IN AQUEOUS PAINTING PLASTIC

(75) Inventors: Stephan Schwarte, Emsdetten (DE); Michael Hartung, Geseke (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/869,257

(22) PCT Filed: Feb. 1, 2000

(86) PCT No.: PCT/EP00/00779

§ 371 (c)(1), (2), (4) Date: Jun. 26, 2001

(87) PCT Pub. No.: WO00/46265

PCT Pub. Date: Aug. 10, 2000

(30) Foreign Application Priority Data

Feb. 3, 1999 (DE) ......................................... 199 04 170
Feb. 5, 1999 (DE) ......................................... 199 04 624

(51) Int. Cl.$^7$ .............................. C08J 3/00; C08K 3/20; C08L 75/00; C08G 18/00; C08G 18/10

(52) U.S. Cl. .................... 524/591; 428/423.1; 524/589; 524/590; 524/839; 524/840; 528/44; 528/60; 528/80; 528/81; 528/83; 528/84; 528/85

(58) Field of Search ........................ 428/423.1; 524/589, 524/590, 591, 839, 840; 528/44, 60, 80, 81, 83, 84, 85

(56) References Cited

U.S. PATENT DOCUMENTS

| | | | |
|---|---|---|---|
| 4,489,135 A | 12/1984 | Drexler et al. ............ | 428/423.1 |
| 4,558,090 A | 12/1985 | Drexler et al. ............... | 524/591 |
| 4,594,385 A | 6/1986 | Thoma et al. ............... | 524/839 |
| 4,851,460 A | 7/1989 | Stranghöner et al. ........ | 523/407 |
| 4,880,867 A | 11/1989 | Gobel et al. ................. | 524/507 |
| 4,914,148 A | 4/1990 | Hille et al. .................. | 524/507 |
| 4,945,128 A | 7/1990 | Hille et al. .................. | 524/591 |
| 5,075,372 A | 12/1991 | Hille et al. .................. | 524/839 |
| 5,308,914 A | 5/1994 | Wallon et al. ............... | 524/591 |
| 5,334,420 A | 8/1994 | Hartung et al. ........... | 427/407.1 |
| 5,342,882 A | 8/1994 | Göbel et al. ................. | 524/832 |
| 5,349,041 A | 9/1994 | Blum et al. ..................... | 528/85 |
| 5,368,944 A | 11/1994 | Hartung et al. ........... | 428/423.1 |
| 5,370,910 A | 12/1994 | Hill et al. ................. | 427/407.1 |
| 5,416,136 A | 5/1995 | Konzmann et al. ......... | 523/414 |
| 5,418,264 A | 5/1995 | Obloh et al. ................. | 523/414 |
| 5,512,322 A | 4/1996 | Hille et al. ............... | 427/407.1 |
| 5,552,496 A | 9/1996 | Vogt-Birnbrich et al. ... | 525/440 |
| 5,569,705 A | 10/1996 | Vogt-Birnbrich et al. ... | 524/591 |
| 5,571,861 A | 11/1996 | Klein et al. ................. | 524/591 |
| 5,623,016 A | 4/1997 | Klein et al. ................. | 524/591 |
| 5,654,391 A | 8/1997 | Göbel et al. ................. | 528/71 |
| 5,658,617 A | 8/1997 | Göbel et al. ............. | 427/372.2 |
| 5,691,425 A | 11/1997 | Klein et al. ................. | 525/455 |
| 6,001,424 A | 12/1999 | Lettmann et al. ........ | 427/407.1 |
| 6,001,915 A | 12/1999 | Schwarte et al. ........... | 524/457 |

FOREIGN PATENT DOCUMENTS

| | | | |
|---|---|---|---|
| CA | 2073115 | 7/1992 | ........... C08L/75/14 |
| CA | 2102169 | 5/1994 | ......... C09D/175/14 |
| CA | 2102170 | 5/1994 | ......... C09D/175/14 |
| DE | 43 28 092 A1 | 2/1995 | ......... C09D/175/04 |
| EP | 0 089 497 A2 | 2/1983 | ............ C09D/3/72 |
| EP | 0 228 003 A1 | 12/1986 | ............ B05D/7/16 |
| EP | 0 234 361 A1 | 2/1987 | ........... C08G/18/08 |
| EP | 0 234 362 A1 | 2/1987 | ........... C08G/18/08 |
| EP | 0 249 201 A2 | 6/1987 | ............ C09D/3/58 |
| EP | 0 256 540 B2 | 8/1987 | ............ C09D/3/49 |
| EP | 0 260 447 A2 | 8/1987 | ......... C08F/283/10 |
| EP | 0 276 501 A2 | 9/1987 | ............ C11D/1/42 |
| EP | 0 299 148 A2 | 4/1988 | ........... C08G/18/08 |
| EP | 0 297 576 A1 | 6/1988 | ............ C09D/3/72 |
| EP | 0 354 261 A1 | 8/1988 | ........... C08G/18/50 |
| EP | 0 394 737 A1 | 4/1990 | ......... C09D/175/06 |
| EP | 0 401 565 A1 | 5/1990 | ............ C09D/5/02 |
| EP | 0 424 705 A2 | 10/1990 | ......... C08F/283/00 |
| EP | 0 521 928 B1 | 3/1991 | |
| EP | 0 521 928 B1 | 10/1991 | ......... C08F/299/06 |
| EP | 0 522 419 A1 | 6/1992 | ........... C08G/18/67 |
| EP | 0 522 420 A2 | 6/1992 | .............. C08J/3/03 |
| EP | 0 523 610 A1 | 7/1992 | ......... C09D/163/00 |

(List continued on next page.)

OTHER PUBLICATIONS

English Language Abstract for WO94/22969 provided with International Publication.
English Language Abstract for DE 4328092 From the EPO.
English Language Abstract for WO99/50359 provided with International Publication.
"Methoden der organischen chemie", Houben–Weyl, vol. 14/2, 4th Edition, Georg Tjieme Verlag, Stuttgart, 1963, pp. 61 to 70, by W. Siefken, Liebigs Annalen der Chemie, vol. 562, pp. 75 to 136.
US patent application 08/564,304, Filed Jan. 22, 1996, Entitled Process for the preparation of polyurethane resins and their use and of ethoxyethly prepionate for the preparation of polyurethane resins, pp. 1–38 for EP 0 708 788 B1.

*Primary Examiner*—Patrick D. Niland

(57) ABSTRACT

A polyurethane which has a number average molecular weight $M_n$ of from 3,000 to 50,000 and an acid number of from 10 to 35 and is preparable by reacting (a1) at least one polyesterpolyol having a number average molecular weight $M_n$ of from 1,000 to 4,000, an acid number of from 0 to 15, and an OH number of from 35 to 150, based on acyclic aliphatic and cycloaliphatic dicarboxylic acids, (a2) a mixture of at least one diol and one triol, (a3) at least one compound containing at least two isocyanate-reactive functional groups and at least one functional group capable of forming anions, and (a4) a mixture of at least one, acyclic aliphatic and at least one cycloaliphatic diisocyanate, to give an isocyanato-containing prepolymer that is then chain extended with a polyfunctional amine or amino alcohol and, if desired, is neutralized.

10 Claims, No Drawings

FOREIGN PATENT DOCUMENTS

| | | | | |
|---|---|---|---|---|
| EP | 0 536 712 A2 | 10/1992 | ......... | C09D/201/02 |
| EP | WO92/17546 | 10/1992 | ......... | C08L/75/04 |
| EP | 0 581 211 A1 | 7/1993 | ........... | C08G/18/08 |
| EP | 0 584 818 B1 | 8/1993 | ........... | C08G/18/08 |
| EP | 0 590 484 A1 | 9/1993 | ........... | C08G/18/08 |
| EP | 0 596 460 A2 | 11/1993 | ......... | C09D/201/00 |
| EP | 0 708 788 B1 | 6/1994 | ........... | C08G/18/08 |
| EP | 0 634 431 A1 | 7/1994 | ........... | C08G/18/12 |
| EP | 0 649 865 A1 | 10/1994 | ........... | C08G/18/67 |
| EP | 0 669 356 A1 | 2/1995 | ......... | C08G/18/83 |
| EP | 0 678 536 A1 | 4/1995 | ........... | C08G/18/08 |
| EP | WO95/14721 | 6/1995 | ......... | C08F/290/14 |
| EP | WO97/12945 | 4/1997 | ............ | C09D/5/04 |
| WO | WO90/01041 | 2/1990 | ........... | C08G/18/08 |
| WO | WO91/13923 | 9/1991 | ........... | C08G/18/08 |
| WO | WO91/14514 | 10/1991 | ............ | B05D/7/26 |
| WO | WO92/15405 | 9/1992 | ............ | B05D/5/06 |
| WO | WO94/22968 | 10/1994 | ......... | C09D/133/06 |
| WO | WO96/12747 | 5/1996 | ......... | C08F/285/00 |
| WO | WO97/49745 | 12/1997 | ........... | C08G/18/08 |
| WO | WO97/49747 | 12/1997 | ........... | C08G/18/75 |

POLYURETHANE AND ITS USE IN AQUEOUS PAINTING PLASTIC

The present invention relates to a novel polyurethane and to a novel polyurethane dispersion and to the use thereof in the aqueous finishing of plastics. The present invention additionally relates to a novel aqueous coating material which comprises the novel polyurethane and the novel polyurethane dispersion. The present invention further relates to a novel process for producing multicoat finishes on plastics. The present invention relates not least to novel finishes, including multicoat finishes, for plastics, and to plastics components which have these novel finishes.

Polyurethanes, their aqueous dispersions, aqueous coating materials based on polyurethanes, the use of these aqueous coating materials as waterborne basecoat materials for producing multicoat finishes, by the wet-on-wet technique, for example, and also the finishes themselves are known from the patents EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 531 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, WO 97/49747 and EP-A-0 401 565.

In automotive OEM finishing, these known aqueous coating materials and processes are outstandingly suitable for the wet-on-wet finishing of metal components coated beforehand with electrocoat materials and primer-surfacers or primers. In the wet-on-wet technique, as is known, the waterborne basecoat material is applied but then is not cured but instead is merely dried. The clearcoat material, in solution in organic solvents, is applied to the waterborne basecoat film, after which the two films are baked together.

Aqueous coating materials for the finishing of plastics are likewise known. They utilize the polyurethane dispersions of the known waterborne basecoat materials, which are described, inter alia, in the patents mentioned above. The plastics finishes in question, however, exhibit considerable weaknesses in moisture resistance. This becomes particularly evident in the condensation test and in the course of steam jet testing. These weaknesses are manifested in a particularly disadvantageous fashion on modern automobile bodies, where finished plastics components and metal components adjoin one another, since it is here that the difference in adhesion is especially pronounced.

It is an object of the present invention to provide a novel polyurethane and a novel polyurethane dispersion which no longer have the disadvantages of the prior art but which instead permit the preparation of aqueous coating materials which can be used for aqueous plastics finishing and provide single-coat or multicoat plastics finishes having outstanding optical properties and outstanding adhesion even following condensation exposure. Moreover, the novel aqueous coating materials should also be easy to apply by the wet-on-wet technique.

The invention accordingly provides the novel polyurethane which has a number average molecular weight Mn of from 3,000 to 50,000 and an acid number of from 10 to 35 and is preparable by reacting (a1) at least one polyesterpolyol having a number average molecular weight Mn of from 1,000 to 4,000, preferably from 1,200 to 3,000, an acid number of from 0 to 15, preferably from 0 to 10, and an OH number of from 35 to 150, preferably from 50 to 120, based on acyclic aliphatic and cycloaliphatic dicarboxylic acids, (a2) a mixture of at least one diol and one triol, (a3) at least one compound containing at least two isocyanate-reactive functional groups (a31) and at east one functional group (a32) capable of forming anions, an (a4) a mixture of at least one acyclic aliphatic and at least one cycloaliphatic diisocyanate, with the proviso that (i) in the mixture (a2) the diols and triols are in a molar ratio of from 2:1 to 13:1, preferably from 2.5:1 to 8:1, (ii) the molar ratio of the polyesterpolyols (a1) to the mixture (a2) is from 4.5:1 to 1:1, preferably from 3.5:1 to 1.5:1, and (iii) in the mixture (a4) the acyclic aliphatic and cycloaliphatic diisocyanates are in a molar ratio of from 1:0.16 to 1:6, preferably from 1:0.5 to 1:5.5;

to give an isocyanato-containing prepolymer which is then chain extended with a polyfunctional amine or amino alcohol and, if desired, is neutralized.

In the text below, the novel polyurethane is referred to, for the sake of clarity, as the "polyurethane of the invention".

The invention additionally provides the novel polyurethane dispersion which comprises at least one polyurethane (A) of the invention dispersed in an aqueous medium (B).

In the text below, the novel polyurethane dispersion is referred to, for the sake of clarity, as the "polyurethane dispersion of the invention".

The invention also provides the novel aqueous coating materials which comprise at least one polyurethane (A) of the invention or one polyurethane dispersion (A/B) of the invention.

In the text below, the novel aqueous coating materials are referred to, for the sake of clarity, as "coating materials of the invention".

The invention also provides a novel process for coating plastics with a multicoat finish by (I) applying a two component waterbased primer and curing it to give a primer coat, (II) applying an aqueous coating material to the primer coat, (III) applying a two component clearcoat material wet on wet, and (IV) curing the resultant basecoat/clearcoat film, using an aqueous coating material comprising (A) at least one polyurethane preparable by reacting (a1) a polyesterpolyol based on acyclic aliphatic and cycloaliphatic dicarboxylic acids, (a2) a mixture of at least one diol and at least one triol, (a3) at least one compound containing at least two isocyanate-reactive functional groups (a31) and at least one functional group (a32) capable of forming anions, and (a4) a mixture of at least one acyclic aliphatic and at least one cycloaliphatic diisocyanate to give an isocyanato-containing prepolymer which is then chain extended with a polyfunctional amine or amino alcohol and, if desired, is neutralized.

In the text below, the novel process for coating plastics with a multicoat finish is referred to, for the sake of brevity, as the "process of the invention".

The invention additionally provides the novel plastics finishes producible by means of the coating materials of the invention and/or with the aid of the process of is the invention.

In the text below, the novel plastics finishes are referred to, for the sake of clarity, as the "plastics finishes of the invention".

The invention provides not least the novel plastics components which carry the plastics finishes of the invention and which are referred to below as "plastics components of the invention".

The polyurethane of the invention has a number average molecular weight Mn of from 3,000 to 50,000 and an acid number of from 10 to 35. It may be prepared by reacting the inventively suitable components described below with one another in the manner described below.

The first important component for preparing the polyurethane of the invention is at least one polyesterpolyol (a1) having a number average molecular weight Mn of from 1,000 to 4,000, preferably from 1,200 to 3,000, an acid number of from 0 to 15, preferably from 0 to 10, and an OH number of from 35 to 150, preferably from 50 to 120, based on acyclic aliphatic and cycloaliphatic dicarboxylic acids.

Examples of suitable acyclic aliphatic dicarboxylic acids for use in accordance with the invention are oxalic acid, malonic acid, succinic acid, glutaric acid, adipic acid, pimelic acid, suberic acid, azelaic acid, sebacic acid, undecanedicarboxylic acid or dodecanedicarboxylic acid, of which adipic acid, glutaric acid, azelaic acid and/or sebacic acid are advantageous and are therefore used with preference.

Examples of suitable cycloaliphatic dicarboxylic acids used in accordance with the invention are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, and tricyclodecanedicarboxylic acid. The cycloaliphatic dicarboxylic acids may be used in both their cis form and their trans form and also as a mixture of both forms.

Also suitable in accordance with the invention are the esterifiable derivatives of the abovementioned dicarboxylic acids, such as, for example, their monoesters or polyesters with aliphatic alcohols having from 1 to 4 carbon atoms or hydroxy alcohols having from 1 to 4 carbon atoms. It is also possible, moreover, to use the anhydrides of the abovementioned dicarboxylic acids, where they exist.

To prepare the polyesterpolyol (a1) the abovementioned dicarboxylic acids are reacted with diols and triols, especially diols. Examples of suitable diols and triols are those described below.

The polyesterpolyol (a1) is prepared by the known methods of esterification, as described for example in DE-A-40 24 204, page 4 lines 50 to 65. The reaction normally takes place at temperatures between 180 and 280° C., in the presence, if desired, of an appropriate esterification catalyst, such as lithium octoate, dibutyltin oxide, dibutyltin dilaurate or paratoluenesulfonic acid, for example.

The polyesterpolyol (a1) is normally prepared in the presence of small amounts of an appropriate azeotrope-forming solvent. Examples of azeotrope formers used include aromatic hydrocarbons, such as xylene in particular, and (cyclo)aliphatic hydrocarbons, e.g. cyclohexane or methylcyclohexane.

The second important component for preparing the polyurethane of the invention is a mixture (a2) of at least one diol and at least one triol.

Suitable diols (a2) are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol or the positionally isomeric diethyloctanediols.

Further examples of suitable diols (a2) are diols of the formula (a21) or (a22)

in which $R_1$ and $R_2$ each represent an identical or different radical and stand for an alkyl radical having from 1 to 18 carbon atoms, an aryl radical or a cycloaliphatic radical, with the proviso that $R_1$ and/or $R_2$ must not be methyl;

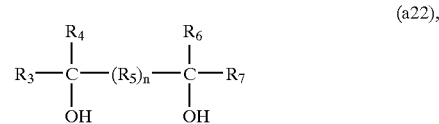

in which $R_3$, $R_4$, $R_6$ and $R_7$ each represent identical or different radicals and stand for an alkyl radical having from 1 to 6 carbon atoms, a cycloalkyl radical or an aryl radical and $R_5$ represents an alkyl radical having from 1 to 6 carbon atoms, an aryl radical or an unsaturated alkyl radical having from 1 to 6 carbon atoms, and n is either 0 or 1.

Suitable diols (a21) include all propanediols of the formula (a21) in which either $R_1$ or $R_2$ or $R_1$ and $R_2$ is or are other than methyl, such as 2-butyl-2-ethyl-1,3-propanediol, 2-butyl-2-metyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo-[2.2.1]heptane, 2,2-diethyl-1,3-propanediol, 2,2-dipropyl-1,3-propanediol or 2-cyclohexyl-2-methyl-1,3-propanediol et cetera.

As diols (a22) (formula a22)) it is possible, for example, to use 2,5-dimethyl-2,5-hexanediol, 2,5-diethyl-2,5-hexanediol, 2-ethyl-5-methyl-2,5-hexane-diol, 2,4-dimethyl-2,4-pentanediol, 2,3-dimethyl-2,3-butanediol, 1,4-bis(2'-hydroxypropyl)benzene and 1,3-bis(2'-hydroxypropyl)benzene.

Examples of suitable triols (a2) are trimethylolethane, trimethylolpropane and glycerol, especially trimethylolpropane.

The third important component for preparing the polyurethane of the invention is at least one compound containing at least two isocyanate-reactive functional groups (a31) and at least one functional group (a32) capable of forming anions.

Suitable isocyanate-reactive functional groups (a31) are, in particular, hydroxyl groups and also primary and/or secondary amino groups, of which hydroxyl groups are advantageous and are therefore used with preference. Functional groups (a32) capable of forming anions are carboxyl, sulfonic acid and/or phosphonic acid groups, of which the carboxyl groups are advantageous and are therefore used with preference. It is preferred to use alkanoic acids having two substituents on the alpha carbon atom. The substituent may be a hydroxyl group, an alkyl group or an alkylol group. These polyols have at least one, generally from 1 to 3, carboxyl groups per molecule. Examples of suitable compounds (a3) are dimethylolpropionic acid, dimethylolpropanesulfonic acid or dimethylolpropanephosphonic acid, especially dimethylolpropionic acid.

In general, compounds (a3) are used in an amount which renders the polyurethanes—generally incompatible with water—dispersible in water following neutralization with the amines or amino alcohols described below. Advantageously, the compounds (a3) are used in an amount which gives an acid number of from 10 to 35 mg KOH/g in the unneutralized prepolymer.

The fourth important component for preparing the polyurethane of the invention is a mixture (a4) of at least one acyclic aliphatic and at least one cycloaliphatic diisocyanate. In the context of the present invention, the term "cycloaliphatic diisocyanate" refers to a diisocyanate in which at least one isocyanate group is attached to a cycloaliphatic radical.

Examples of suitable cycloaliphatic diisocyanates (a4) for use in accordance with the invention are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate or dicyclohexylmethane 4,4'-diisocyanate, especially isophorone diisocyanate.

Examples of suitable acyclic aliphatic diisocyanates for use in accordance with the invention are trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate or diisocyanates derived from dimer fatty acids, as sold under the commercial designation DDI 1410 by Henkel and described in the patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane. The latter are counted among the acyclic aliphatic diisocyanates for the purposes of the present invention, owing to their two isocyanate groups attached exclusively to alkyl groups, and despite their cyclic groups. Of these diisocyanates, hexamethylene diisocyanate is advantageous in accordance with the invention and is therefore used with particular preference.

In accordance with the invention, the above-described important components (a1), (a2), (a3), and (a4) are reacted with one another with the proviso that (i) in the mixture (a2) the diols and the triols are in a molar ratio of from 2:1 to 13:1, preferably from 2.5:1 to 8:1, (ii) the molar ratio of the polyesterpolyols (a1) to the mixture (a2) is from 4.5:1 to 1:1, preferably from 3.5:1 to 1.5:1, and (iii) in the mixture (a4) the acyclic aliphatic and cycloaliphatic diisocyanates are in a molar ratio of from 1:0.16 to 1:6, in particular from 1:0.5 to 1:5.5.

In this context, the above-described important components (a1), (a2), (a3), and (a4) are reacted with one another in a ratio such as to give, in accordance with the invention, an isocyanato-containing prepolymer.

The reaction of components (a1), (a2), (a3), and (a4) takes place in accordance with the well-known methods of organic chemistry (cf., e.g., Kunststoff-Handbuch, Volume 7: Polyurethane, edited by Dr. Y. Oertel, Carl Hanser Verlag, Munich, Vienna 1983). Examples of the preparation of the prepolymers is described in DE-A-26 24 442 and DE-A-32 10 051.

The reaction of the components takes place, if desired, in ethoxyethyl propionate (EEP) as solvent. The amount of EEP may vary within wide limits and should be sufficient to form a prepolymer solution of appropriate viscosity. Generally speaking use is made of up to 70% by weight, preferably from 5 to 50% by weight, with particular preference less than 20% by weight, of solvent, based on the solids. Accordingly, for example, the reaction may be conducted with very particular preference at a solvent content of 10–15% by weight EEP, based on the solids.

If, desired, components (a1), (a2), (a3), and (a4) may be reacted in the presence of a catalyst, such as organotin compounds and/or tertiary amines.

To prepare the prepolymers, the amounts of the components are chosen such that the equivalents ratio of NCO to OH groups is between 2.0:1.0 and >1.0:1.0, preferably between 1.4:1 and 1.1:1.

The NCO prepolymer contains at least approximately 0.5% by weight of isocyanate groups, preferably at least 1% by weight NCO, based on the solids. The upper limit is approximately 15% by weight, preferably 10% by weight, with particular preference 5% by weight NCO.

The isocyanate groups of the isocyanato-containing prepolymer are reacted with a modifier or chain extender. The modifier is preferably added in an amount such that chain extensions and hence increases in molecular weight occur. Modifiers used in accordance with the invention are organic compounds containing secondary and/or primary amino groups and also, if desired, hydroxyl groups, especially amino alcohols and/or polyamines having a functionality of two, three and/or more. Examples of suitable polyamines are ethylenediamine, trimethylenediamine, tetramethylenediamine, pentamethylenediamine, hexamethylenediamine, and diethylenetriamine. Examples of suitable amino alcohols are ethanolamine, propanolamine, diethanolamine, and dipropanolamine. The polyamines and/or amino alcohols may also be used to neutralize the carboxylic, sulfonic and/or phosphonic acid groups incorporated into the prepolymer.

The resultant polyurethane of the invention is neutralized if desired, provided this has not yet taken place by means of the amino alcohols and/or amines described above. Examples of suitable neutralizing agents are ammonia, ammonium salts, such as ammonium carbonate or ammonium hydrogen carbonate, for example, and also tertiary amines, such as trimethylamine, triethylamine, tributylamine, dimethylaniline, diethylaniline or triphenylamine, and/or amino alcohols such as dimethylethanolamine, diethylethanolamine, methyldiethanolamine or triethanolamine. Neutralization may take place in organic phase or in aqueous phase. Dimethylethanolamine is used with preference as neutralizing agent.

In accordance with the invention, the polyurethane of the invention is dispersed in an aqueous medium (B).

The aqueous medium (B) contains substantially water. The aqueous medium here may contain minor amounts of organic solvents such as ethoxyethyl propionate, butyl glycol and/or methyl, ethyl ketone, the above-described neutralizing agents, the below-described crosslinking agents and/or coating additives (D) and/or other dissolved solid, liquid or gaseous, organic and/or inorganic substances of low and/or high molecular mass. In the context of the present invention, the term "minor amounts" means an amount which does not take away the aqueous character of the aqueous medium.

Alternatively, the aqueous medium (B) may comprise water alone.

The polyurethane dispersion (A/B) of the invention may be put to numerous end uses. It is especially suitable for use in the finishing of plastics, especially in the form of the coating material of the invention.

The coating material of the invention advantageously comprises a basecoat material.

The coating material of the invention comprises color and/or effect pigments (C) in customary and known amounts. The pigments may comprise organic or inorganic compounds and may provide effect and/or color. On the basis of this large number of suitable pigments, therefore, the coating material of the invention ensures universal scope for use of the coating materials and makes it possible to realise a large number of shades and optical effects.

Effect pigments (C) which can be used include metal flake pigments such as commercially customary aluminum bronzes, aluminum bronzes chromated in accordance with DE-A-36 36 183, and commercially customary stainless steel bronzes, and also nonmetallic effect pigments, such as pearlescent pigments and interference pigments for example. Examples of suitable inorganic color pigments (C) are titanium dioxide, iron oxides, Sicotrans yellow, and carbon black. Examples of suitable organic color pigments are indanthrene blue, Cromophthal red, Irgazine orange, and Heliogen green.

The coating material of the invention may further comprise customary and known, effective amounts of organic and inorganic fillers (C). Examples of suitable fillers are chalk, calcium sulfates, barium sulfate, silicates such as talc or kaolin, silicas, oxides such as aluminum hydroxide or magnesium hydroxide, nanoparticles or organic fillers such as textile fibers, cellulose fibers, polyethylene fibers or wood flour.

The coating material of the invention further comprises coatings additives (D) in customary and known, effective amounts.

Examples of suitable coatings additives (D) are UV absorber; free radical scavengers; crosslinking catalysts, especially organometallic compounds, preferably organotin and/or organobismuth compounds or tertiary amines; slip additives; polymerization inhibitors; defoamers; adhesion promoters; leveling agents or film formation auxiliaries, e.g., cellulose derivatives.

As coatings additive (D) it is possible in particular to use at least one rheology control additive. Examples of suitable rheology control additives (D) are those known from the patents WO 94/22968, EP-A-0 276 501, EP-A-0 249 201 and WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene maleic anhydride copolymers and their derivatives or hydrophobically modified ethoxylated urethanes or polyacrylates. As rheology control additives (D) it is preferred to use polyurethanes and/or phyllosilicates.

Where the coating material of the invention is employed as a two component system, a customary and known polyisocyanate crosslinking agent is added to it prior to application.

Examples of suitable crosslinking agents of this kind are, in particular, those known as paint polyisocyanates, containing free isocyanate groups attached to aliphatic, cycloaliphatic, araliphatic and/or aromatic moieties. It is preferred to use polyisocyanates containing from 2 to 5 isocyanate groups per molecule and having viscosities of from 100 to 10,000, preferably from 100 to 5000, and—where manual mixing of the constituents of the coating material is envisaged—in particular from 500 to 2000 mPas (at 23° C.). If desired, small amounts of organic solvent, preferably from 1 to 25% by weight based on polyisocyanate alone, may be added to the polyisocyanates in order to improve the ease of incorporation of the isocyanate and, where appropriate, to lower the viscosity of the polyisocyanate to a level within the abovementioned ranges. Examples of suitable solvent additives for the polyisocyanates are ethoxyethyl propionate, amyl methyl ketone, and butyl acetate. Moreover, the polyisocyanates may have undergone conventional hydrophilic or hydrophobic modification.

Examples of suitable isocyanates are, for example, described in "Methoden der organischen Chemie", Houben-Weyl, Volume 14/2, $4^{th}$ edition, Georg Thieme Verlag, Stuttgart 1963, pages 61 to 70 and by W. Siefken, Liebigs Annalen der Chemie, Volume 562, pages 75 to 136. Examples of those suitable are the isocyanates mentioned in connection with the description of the polyurethane of the invention, and/or isocyanato-containing prepolymers which can be prepared by reacting polyols with an excess of polyisocyanates and which are preferably of low viscosity.

Further examples of suitable polyisocyanates are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolopropane and glycerol, for example. It is preferred to use aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,3-bis(isocyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane or mixtures of these polyisocyanates.

Very particular preference is given to using mixtures of polyisocyanates which contain uretdione and/or isocyanurate and/or allophanate groups and are based on hexamethylene diisocyanate, such mixtures being as formed by catalytic oligomerization of hexamethylene diisocyanate using appropriate catalysts. Moreover, the polyisocyanate constituent may also comprise any desired mixtures of the free polyisocyanates given by way of example.

Where necessary, the coating material of the invention is adjusted to the appropriate application viscosity using deionized water. It may be applied using the customary and known application methods, such as spraying, knife coating, brushing, flow coating, dipping or rolling, for example, to any desired substrates, such as metal, wood, plastic, glass or paper, for example, but especially plastic.

The coating material of the invention is outstandingly suitable in particular for the process of the invention.

The process of the invention is used to coat plastics with a multicoat finish.

The process starts in step (I) with the application and curing of a two component waterbased primer to give a primer coat. Suitable waterbased primers in this context are the customary and known, commercially available primers for plastics.

In step (II) of the process, an aqueous coating material is applied to the primer coat. In accordance with the invention the aqueous coating material used here is one which (A) comprises at least one polyurethane preparable by reacting
   (a1) a polyesterpolyol based on acyclic aliphatic and cycloaliphatic dicarboxylic acids,
   (a2) a mixture of at least one diol and at least one triol,
   (a3) at least one compound containing at least two isocyanate-reactive functional groups (a31) and at least one functional group (a32) capable of forming anions, and
   (a4) a mixture of at least one acyclic aliphatic and at least one cycloaliphatic diisocyanate to give an isocyanato-containing prepolymer which is then chain extended with a polyfunctional amine and/or amino alcohol and, if desired, is neutralized.

For the process of the invention it is of advantage if the polyurethane (A) is in dispersion in an aqueous medium (B).

Examples of polyurethanes (A) and polyurethane dispersions (A/B) which are outstandingly suitable for the process of the invention are the polyurethanes and polyurethane dispersions of the invention described in detail above.

In accordance with the invention, the applied coating material is merely dried, but not completely cured.

In step (III) of the process, a two component clearcoat material is applied wet-on-wet to the basecoat film applied in step (II) of the process. In this step it is possible to employ the clearcoat materials which are known from automotive refinish and which comprise binders containing isocyanate-reactive groups and the above-described polyisocyanates as crosslinking agents in solution or dispersion in organic solvents.

In accordance with the invention, in step (IV) of the process, the resultant basecoat/clearcoat film is cured to give the multicoat plastics finishes of the invention.

The plastics finish produced in accordance with the process of the invention and/or with the aid of the coating material of the invention is outstandingly suitable for coating all customary and known primed or unprimed plastics.

Examples of such plastics are ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations to DIN 7728T1). The plastics to be coated may of course also be polymer blends, modified plastics or fiber reinforced plastics. It is also possible to employ plastics commonly used in vehicle construction especially motor vehicle construction.

Nonfunctionalized and/or nonpolar substrate surfaces are advantageously subjected prior to coating in a customary and known manner to a pretreatment, for instance by means of a plasma or by flaming.

The plastics finishes of the invention exhibit outstanding adhesion between the layers and on the plastics surface, even under extremely moist and hot climatic conditions. The visual impression is outstanding.

INVENTIVE AND COMPARATIVE EXAMPLES

Preparation Example 1

The Preparation of the Inventive Polyurethane Dispersion 1

3638 parts by weight of a polyesterpolyol having a number average molecular weight Mn of 1819 and an acid number of 3.5 (prepared from 7.094 mol of adipic acid, 7.094 mol of hexahydrophthalic anhydride and 15.962 mol of hexanediol), 1559 parts by weight of methyl ethyl ketone and 80.4 parts by weight of trimethylolpropane, 88.4 parts by weight of neopentyl glycol, 504 parts by weight of hexamethylene diisocyanate and 666 parts by weight of isophorone diisocyanate were heated at 65° C. under a nitrogen atmosphere in an appropriate reaction vessel, with stirring. The reaction was carried out until the NCO content was 1.0% by weight, based on the resin solids. Thereafter, 121.7 parts by weight of diethanolamine were added, and the mixture was stirred at 65° C. until free isocyanate groups were no longer detectable. The resultant polyurethane had an acid number of 21.

Subsequently, 123.2 parts by weight of dimethylethanolamine and 1054 parts by weight of butyl glycol were added slowly with stirring, after which 11,185 parts by weight of deionized water were introduced slowly into the mixture. The methyl ethyl ketone was distilled off under reduced pressure.

The result was a fine dispersion whose pH was adjusted to 7.4 using dimethylethanolamine and whose nonvolatile fraction was adjusted to 27 percent using deionized water.

Preparation Example 2

The preparation of the Noninventive Polyurethane Dispersion 2

3562 parts by weight of a polyesterpolyol having a number average molecular weight Mn of 1819 and an acid number of 3.5 (prepared from 1 mol of a dimer fatty acid with a dimer content of at least 98% by weight, a trimer content of not more than 2% by weight and a monomer content in the trace range, 1 mol of isophthalic acid and 2.626 mol of hexanediol), 2751 parts by weight of methyl ethyl ketone, 287 parts by weight of dimethylolpropionic acid, 44 parts by weight of neopentyl glycol and 1332 parts by weight of isophorone diisocyanate were heated at 80° C. under a nitrogen atmosphere in an appropriate reaction vessel, with stirring. The reaction was carried out until the NCO content was 1.0% by weight, based on the resin solids. Thereafter, 184 parts by weight of trimethylolpropane were added, and the mixture was stirred at 80° C. until free isocyanate groups were no longer detectable. The resultant polyurethane had an acid number of 24.

Subsequently, 166 parts by weight of dimethylethanolamine and 1044 parts by weight of butyl glycol were added slowly with stirring, after which 11,574 parts by weight of deionized water were introduced slowly into the mixture. The methyl ethyl ketone was distilled off under reduced pressure.

Preparation Example 3

The Preparation of the Noninventive Polyurethane Dispersion 3

To prepare the noninventive polyurethane dispersion 3, Example 1.1 "binder dispersion A" described on page 9 of European patent EP-B-0 521 928 was repeated. The resultant, coagulum-free dispersion having a pH of 8.1 was adjusted to a solids content of 27 percent using deionized water.

The result was a fine dispersion whose pH was adjusted to 7.4 using dimethylethanolamine and whose nonvolatile fraction was adjusted to 27 percent using deionized water.

Inventive Example 1
Preparation of an Inventive White Solid-color Waterborne Basecoat Material 1

42 parts by weight of the inventive polyurethane dispersion from Preparation example 1 were mixed in a dissolver for 15 minutes with 9 parts by weight of butyl glycol, 3.5 parts by weight of a commercially customary anionic dispersing aid, 0.5 part by weight of a commercially customary defoamer, 7 parts by weight of a commercial inorganic thickener (phyllosilicate; Laponite® from Laporte) and 31 parts by weight of titanium dioxide. The resultant mixture was dispersed in a bead mill to a particle size of 15 $\mu$m.

The pH of the solid-color waterborne basecoat material was subsequently adjusted to 8.0 using dimethylethanolamine. For application, the solid-color waterborne basecoat material was adjusted to a viscosity of 25 s in the DIN 4 cup using deionized water.

Inventive Example 2
The Preparation of the Inventive Green Solid-color Waterborne Basecoat Material 2

50 parts by weight of the inventive polyurethane dispersion from Preparation example 1 were mixed in a dissolver for 15 minutes with 9 parts by weight of butyl glycol, 2.8 parts by weight of the commercially customary anionic dispersing aid, 0.5 part by weight of the commercially customary defoamer, 7 parts by weight of the commercial inorganic thickener, eight parts by weight of titanium dioxide and 04 part by weight of a commercially customary organic green pigment. The mixture was then dispersed in a bead mill to a particle size of 15 $\mu$m.

The pH of the solid-color waterborne basecoat material was subsequently adjusted to 8.0 using dimethylethanolamine. For application, its viscosity was adjusted to 25 s in the DIN 4 cup using deionized water.

Comparative Examples C1 to C6
The Preparation of the Noninventive Waterborne Basecoat Materials C1 to C6

Inventive examples 1 and 2 were repeated but using, instead of the inventive polyurethane dispersion 1 from Preparation example 1,

- for Comparative examples C1 and C2, a commercial polyurethane dispersion (Daotan® VTW 1237 from Vianova);
- for Comparative examples C3 sand C4, the non-inventive polyurethane dispersion 3 from Preparation example 3; and
- for Comparative examples C5 and C6, the non-inventive polyurethane dispersion 2 from Preparation example 2.

Inventive Examples 3 and 4 and Comparative Examples C7 to C12
The Preparation of Inventive (Inventive Examples 3 and 4) and Noninventive (Comparative Examples C7 to C12) Plastics Finishes For Inventive example 3, the inventive waterborne basecoat material 1 from Inventive example 1 and, for Inventive example 4, the inventive waterborne basecoat material 2 from Inventive example 1 was used.

For Comparative examples C7 and C8, the waterborne basecoat materials from Comparative examples C1 and C2, respectively, were used.

For Comparative examples C9 and C10, the waterborne basecoat materials from Comparative examples C3 and C4, respectively, were used.

For Comparative examples C11 and C12, the waterborne basecoat materials from Comparative examples C5 and C6, respectively, were used.

The surface of plastics panels made from commercial polypropylene (PP) which is used in vehicle construction for the production of fenders (Daplen® from PCD) was flame treated using a propane gas flame and coated with a commercially customary two-component waterbased primer. The resultant primer coats had a thickness of from 15 to 20 $\mu$m after drying at 60° C. for 15 minutes. The waterborne basecoat materials of Inventive examples 1 and 2 and of Comparative examples C1 to C6 were applied to the primer coats using a gravity feed gun. Following a flashoff time of 10 minutes, a commercial component clearcoat material was applied. The resultant multicoat finishes were baked at 90° C. for 30 minutes.

All multicoat finishes were subjected to the following in tests:

T1: 668 hours of condensate water exposure to DIN 50017; assessment of the surface to DIN 53209.

T2: as P1; assessment of the adhesion to DIN 53151.

T3: steam jet test (a circular jet nozzle with a water pressure of 80 bar and water temperature of 80° C. was directed onto the test area, into which a St. Andrew's Cross had been scribed, at a distance of 10 cm for 2 minutes).

The table gives an overview of the test results obtained.

TABLE

Test results

| Inventive and Comparative examples | T1 | T2 | T3 |
|---|---|---|---|
| 3 | m0/g0 | Gt 0 | no flaking |
| 4 | m0/g0 | Gt 0 | no flaking |
| C7 | m2/g1 | Gt 0 | 1 mm flaking |
| C8 | m1/g2 | Gt 1 | no flaking |
| C9 | m3/g3 | Gt 5 | 5 mm flaking |
| C10 | m4/g3 | Gt 5 | no flaking |
| C11 | m2/g2 | Gt 2 | no flaking |
| C12 | m3/g2 | Gt 3 | 2 mm flaking |

The test results underline the superiority of the inventive finishes, based on the inventive coating materials or inventive polyurethane dispersions 1 and 2 over the finishes based on the noninventive coating materials or noninventive polyurethane dispersions.

What is claimed is:

1. A polyurethane comprising a reaction product of (a1) at least one polyesterpolyol having a number average molecular weight $M_n$ of from 1,000 to 4,000, an acid number of from 0 to 15, and an OH number of from 35 to 150, wherein the polyesterpolyol is an esterification product of at least one of an acyclic aliphatic dicarboxylic acid, an anhydride of an acyclic aliphatic dicarboxylic acid, an esterifiable derivative of an acyclic aliphatic dicarboxylic acid, a cycloaliphatic dicarboxylic acid, an anhydride of a cycloaliphatic dicarboxylic acid, and an esterifiable derivative of a cycloaliphatic dicarboxylic acid, (a2) a mixture of at least one diol and one triol, (a3) at least one compound containing at least two isocyanate-reactive functional groups and at least one functional group capable of forming anions, and (a4) a mixture of at least one acyclic aliphatic and at least one cycloaliphatic diisocyanate, wherein the polyurethane has a number average molecular weight $M_n$ of from 3,000 to 50,000 and an acid number of from 10 to 35, with the proviso that (i) in the mixture (a2), the diols and triols are in a molar ratio of from 2:1 to 13:1, (ii) the molar ratio of the polyesterpolyols (a1) to the mixture (a2) is from 4.5:1 to 1:1, and (iii) in the mixture (a4), the acyclic aliphatic and cycloaliphatic diisocyanates are in a molar ratio of from 1:0.16 to 1:6;

wherein the polyurethane is an isocyanato-containing prepolymer that is then chain extended with a polyfunctional amine or amino alcohol.

2. A polyurethane dispersion comprising (A) at least one polyurethane as claimed in claim 1

(B) in dispersion in an aqueous medium comprising water.

3. The polyurethane as claimed in claim 1, wherein the polyurethane is used to make at least one of a plastics finish, an aqueous coating material, and an aqueous coating material for plastic finishing.

4. The polyurethane dispersion as claimed in claim 2, wherein the polyurethane dispersion is used to make at least one of a plastics finish, an aqueous coating material, and an aqueous coating material for plastic finishing.

5. The polyurethane as claimed in claim 1 in an aqueous coating material, said aqueous coating material further comprising at least one of color pigments, effect pigments, and coatings additives.

6. The polyurethane dispersion as claimed in claim 2 in an aqueous coating material, said aqueous coating material further comprising at least one of color pigments, effect pigments, and coatings additives.

7. A plastics finish that is obtained by the steps of (I) applying a two component water based primer and curing it to give a primer coat, (II) applying to the primer coat as a basecoat, an aqueous coating material comprising the polyurethane of claim 1, (III) applying a two component clearcoat material wet on wet, and (IV) curing the resultant basecoat and clearcoat films.

8. A plastics finish that is obtained by the steps of (I) applying a two component water based primer and curing it to give a primer coat, (II) applying to the primer coat as a basecoat, an aqueous coating material comprising the polyurethane dispersion of claim 2, (III) applying a two component clearcoat material wet on wet, and (IV) curing the resultant basecoat and clearcoat films.

9. The polyurethane of claim 1, wherein the polyurethane is neutralized.

10. The polyurethane dispersion of claim 2, wherein the polyurethane is neutralized.

* * * * *